(12) United States Patent
Koblick

(10) Patent No.: US 12,365,488 B2
(45) Date of Patent: Jul. 22, 2025

(54) INTERACTIVE OBJECT TRAJECTORY PREDICTION SYSTEMS AND METHODS

(71) Applicant: Raytheon Company, Waltham, MA (US)

(72) Inventor: Darin Charles Koblick, El Segundo, CA (US)

(73) Assignee: Raytheon Company, Arlington, VA (US)

( * ) Notice: Subject to any disclaimer, the term of this patent is extended or adjusted under 35 U.S.C. 154(b) by 357 days.

(21) Appl. No.: 17/896,634

(22) Filed: Aug. 26, 2022

(65) Prior Publication Data

US 2024/0400231 A1 Dec. 5, 2024

(51) Int. Cl.
*B64G 3/00* (2006.01)
*B64G 1/24* (2006.01)
*B64G 1/36* (2006.01)

(52) U.S. Cl.
CPC ............ *B64G 1/242* (2013.01); *B64G 1/36* (2013.01); *B64G 3/00* (2013.01)

(58) Field of Classification Search
CPC ............ B64G 1/242; B64G 1/36; B64G 3/00
USPC ...................................................... 250/492.1
See application file for complete search history.

(56) References Cited

U.S. PATENT DOCUMENTS 9,990,766 B2 * 6/2018 Jia ........................... G06T 17/00
11,346,684 B2 5/2022 Sheha et al.

OTHER PUBLICATIONS

Folta, et al., "Earth-Moon libration point orbit stationkeeping: Theory, modeling, and operations;" Acta Astronautica; Jan. 2013; 14 pages.

Strange, et al., "Graphical Method for Gravity-Assist Trajectory Design;" Journal of Spacecraft and Rockets, vol. 39 No.1; Jan.-Feb. 2002; 8 pages.

* cited by examiner

*Primary Examiner* — Michael Maskell
(74) *Attorney, Agent, or Firm* — Schwegman Lundberg & Woessner, P.A.

(57) ABSTRACT

An interactive orbital trajectory prediction system including a processor arranged to simultaneously display: i) a surface of the first primary body including the relative predicted trajectory of the object, ii) a surface of the second primary body including the relative predicted trajectory of the object, and iii) the barycenter of the two primary bodies, and the trajectory of the object with respect to the barycentric reference frame. The system includes an input device arranged to receive a user selection of a first sensor module of a plurality of sensor modules used to predict the trajectory of the object orbiting the primary body. The processor, in response to the user selection of the first sensor module, predicts the flight path of the object based on the first sensor module.

20 Claims, 19 Drawing Sheets

INTERACTIVE OBJECT TRAJECTORY PREDICTION SYSTEMS AND METHODS

TECHNICAL FIELD

This application relates generally to object trajectory prediction systems and, more particularly, to orbit or trajectory prediction techniques for an object orbiting one or more primary bodies.

BACKGROUND

The trajectory or flight path of objects traveling through space can be affected by the gravitational fields of massive objects or planetary bodies such as the Earth, Moon, and the Sun also referred to as primary bodies. Many man-made objects such as satellites, spacecraft, and space debris are currently orbiting the Earth. Techniques for accurately predicting the trajectory of satellites, including those in cislunar orbits, are desirable to avoid catastrophic collisions. Existing trajectory estimation techniques involve a particular prediction model or set of algorithms that implement the model. Furthermore, these techniques involve user interfaces and user information to adequately understand predicted trajectories in a timely manner. Hence, there is a need for a more flexible, efficient, and comprehensive object trajectory predication tools and user interfaces.

SUMMARY

The application, in various implementations, addresses deficiencies associated with existing flight path and/or object trajectory prediction systems and user interactions with such systems. In the context of this patent application, flight path is defined as the course of an aircraft or space craft. Trajectory is defined as the path followed by an object moving under the action of given forces.

This application describes exemplary systems and methods that enable a user, via a graphical user interface (GUI), to efficiently select a type of sensor module, a target trajectory, and a type of object tracking model among other model features, while providing a visual display of the object's predicted trajectory with respect to the surface of two celestial bodies, such as Earth and it's Moon, and a visual display of their barycenter including the predicated trajectory of the object. In this way, a user can efficiently configure the object trajectory and/or orbit prediction system while receiving more comprehensive and understandable visual information regarding the object's predicted trajectory.

In one aspect, an interactive object trajectory prediction system includes a processor arranged to simultaneously display: i) a surface of the first primary body including the relative predicted trajectory of the object, ii) a surface of the second primary body including the relative predicted trajectory of the object, and iii) the barycenter of the two primary bodies, and the trajectory of the object with respect to the barycentric reference frame. The system includes an input device arranged to receive a user selection of a first sensor module of a plurality of sensor modules used to predict the flight path of the object orbiting the primary bodies. The processor, in response to the user selection of the first sensor module, predicts the flight path of the object based in part on the first sensor module.

The system may include a data interface arranged to receive object position data from one or more object position sensors where the processor predicts the trajectory based in part on the object position data. One or more object position sensors may be located on the larger primary, on the smaller primary, or in orbit between the two. The displayed barycentric reference frame may depict the locations of the one or more position sensors. The processor may be further arranged to simultaneously display the object signal-to-noise ratio (SNR) from at least one or more sensors.

The first sensor module may include an electro optical/infrared (EOIR) module, a RADAR module, or a quantum RADAR module. The primary bodies may include the Moon, Earth, Mars, Sun, or any celestial body. The trajectory prediction system may include a cislunar orbit prediction system. The surfaces of both primaries are displayed in both two-dimensional and three-dimensional format. The object may include a spacecraft, satellite, space debris, a meteor, a comet, ballistic missile, subsonic missile, supersonic missile, hypersonic missile, and/or cruise missile.

In another aspect, a method for interactively predicting a flight path or trajectory of an object orbiting the primary bodies includes: receiving a user selection of a first sensor module of a plurality of sensor modules used to predict the trajectory of the object orbiting the primary bodies; in response to the user selection of the first sensor module, predicting the trajectory of the object based on the first sensor module; and simultaneously displaying i) a surface of the first primary body including the relative predicted trajectory of the object, ii) a surface of the second primary body including the relative predicted trajectory of the object, and iii) the barycenter of the two primary bodies, and the trajectory of the object with respect to the barycentric reference frame.

In a further aspect, a non-transient computer readable medium containing program instructions for causing a computer to interactively predict the a trajectory of an object orbiting one or more primary bodies includes the method of: receiving a user selection of a first sensor module of a plurality of sensor modules used to predict the trajectory of the object orbiting the primary body; in response to the user selection of the first sensor module, predicting the trajectory of the object based on the first sensor module; and simultaneously displaying i) a surface of the first primary body including the relative predicted trajectory of the object, ii) a surface of the second primary body including the relative predicted trajectory of the object, and iii) the barycenter of the two primary bodies, and the trajectory of the object with respect to the barycentric reference frame.

In another aspect, an interactive object trajectory prediction system includes a processor arranged to simultaneously display: i) a surface of a first primary body of a plurality of primary bodies including a predicted trajectory of the object orbiting the first primary body and ii) a barycentric reference frame showing the trajectory of the object in relation to the plurality of primary bodies within the barycentric reference frame. The system also includes an input device arranged to receive a user selection of a first sensor module of a plurality of sensor modules used to predict the trajectory of the object orbiting the first primary body. The processor, in response to the user selection of the first sensor module, predicts the trajectory of the object based in part on the first sensor module.

In a further aspect, a method for interactively predicting a trajectory of an object orbiting a first primary body of a plurality of primary bodies includes: receiving a user selection of a first sensor module of a plurality of sensor modules used to predict the trajectory of the object orbiting the first primary body; in response to the user selection of the first sensor module, predicting the trajectory of the object based on the first sensor module; and simultaneously displaying on a display: i) a surface of the first primary body including a predicted trajectory of the object orbiting the first primary body and ii) a barycentric reference frame showing the trajectory of the object in relation to the plurality of primary bodies within the barycentric reference frame.

In another aspect, a non-transient computer readable medium containing program instructions for causing a computer to interactively predict a trajectory of an object orbiting a first primary body of a plurality of planetary bodies comprising the method of: receiving a user selection of a first sensor module of a plurality of sensor modules used to predict the trajectory of the object orbiting the first primary body; in response to the user selection of the first sensor module, predicting the trajectory of the object based on the first sensor module; and simultaneously displaying on a display: i) a surface of the first primary body including a predicted trajectory of the object orbiting the first primary body and ii) a barycentric reference frame showing with the trajectory of the object in relation to the plurality of primary bodies within the barycentric reference frame. The trajectory of an object may include movement of an object in space, in a uncontrolled or controlled manner, which may include a flight path of an object such as a spacecraft, aircraft, missile, satellite, or drone or its trajectory which may include space debris, a comet, or an asteroid Any two or more features described in this specification, including in this summary section, may be combined to form implementations not specifically described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
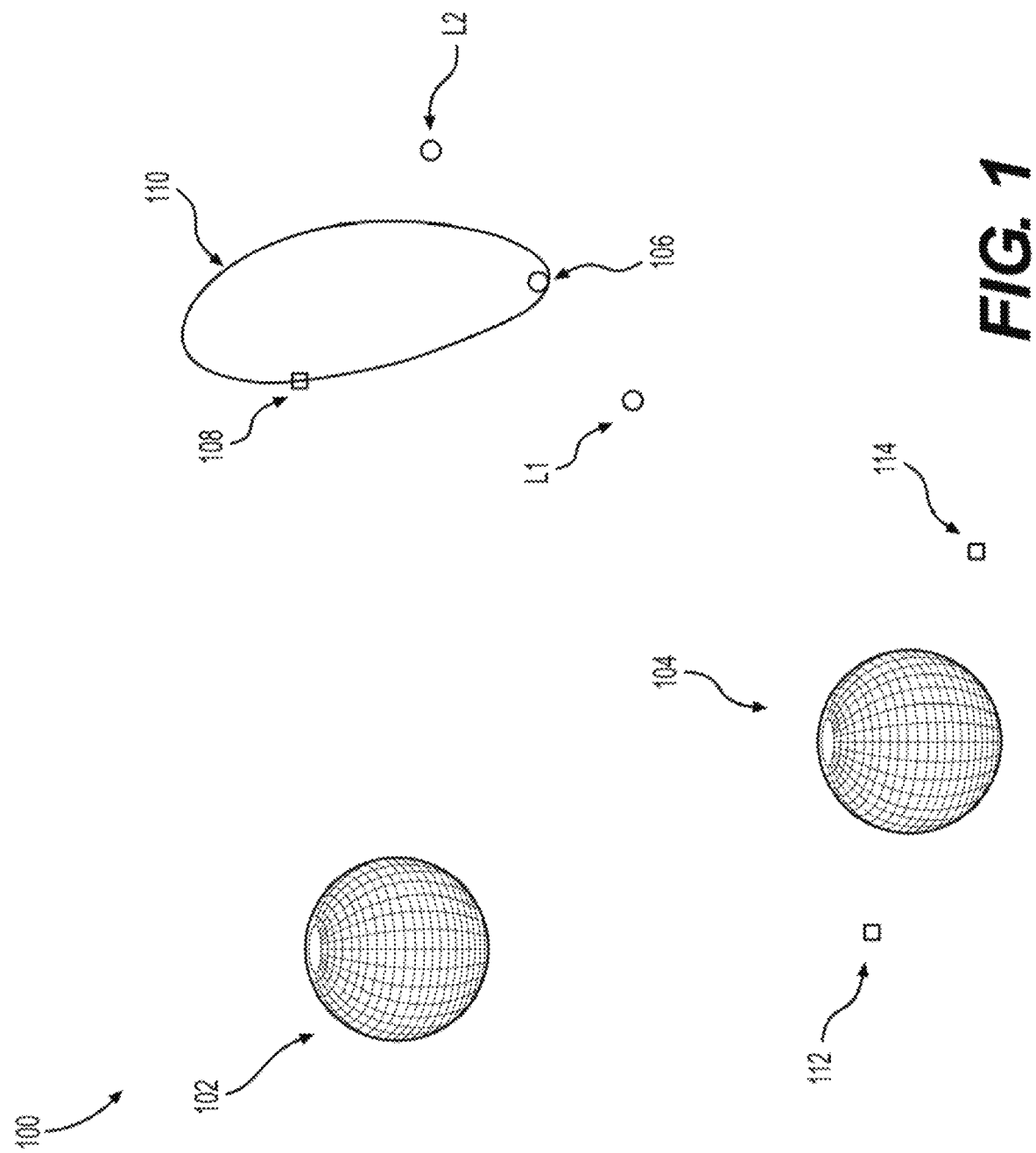
FIG. 1 is a diagram shows a solar system view including the Sun, Earth, and Moon where an object is in a Near Rectilinear Halo Orbit (NRHO) with respect to the barycentric frame of reference.

The application, in various implementations, addresses deficiencies associated with existing object trajectory and/or orbit prediction systems and user interactions with such systems.

Various implementations include interactive systems and methods that enable a user, via a graphical user interface (GUI), to efficiently select a type of sensor module, an object tracking file, and a type of object tracking model among other model features, while providing a visual display of the object's predicted trajectory and/or flight path with respect to the surface of a primary body, such as the Moon, and a visual display of a barycentric reference frame including the predicated trajectory of the object. In this way, a user is able to efficiently configure the object trajectory and/or orbit prediction system while receiving more comprehensive and understandable visual information regarding the object's predicted trajectory.

In some implementations, a GUI is provided for a target tracking framework that enables rapid numerical simulations and trade studies of angles-only, range-only, and angles+range, Doppler, and angular rate sensor/cross-link measurements against other targets which may follow orbital/ballistic, circular restricted three body, highly maneuvering (e.g. boost phase or powered flight), and hypersonic glide or cruise missile trajectories. The underlying implementation may use an Unscented Kalman Filter (UKF), or other type of sequential filter, on high-precision astro/aerodynamics models. All core routines can be optimized for speed in C and compiled in a standalone Dynamic-link Library (DLL). In various implementations, this framework can support interplanetary studies as all rotation rates and gravity terms are user definable. Upgrades may include adding a high-precision gravitational force model, a constant velocity coordinated turn model, a hypersonic cruise vehicle aerodynamic model, and a random walk acceleration model. A measurement model may also be implemented in the satellite Radial, Along-Track, Orbit Normal (RSW) reference frame which supports range rate (e.g. doppler) and angular rate measurements in addition to range and angles measurements obtained from traditional sensor phenomenologies.

In some implementations, a GUI receives user configuration selections and displays information related to the dynamics of ballistic missiles, hypersonic glide and cruise missiles, high fidelity satellite orbits, and circular restricted three body orbits in cislunar space.

In certain implementations, a GUI enables user input selections and rapidly models the non-resolved detect and track performance of RADAR, Electro-Optical and Infrared (EOIR), and Quantum RADAR sensor systems against a range of targets which may include: subsonic, supersonic, hypersonic missiles, satellites, space debris, planets, and stars. In other implementations, the GUI supports user selections and the display of data related to ground, airborne, and space-based RADAR/EOIR/Quantum sensor systems. The object trajectory prediction system may include a radiometric sensor model which incorporates physics-based interactions between the sensor and target. The object trajectory prediction system may be implemented to work with an object tracking library, which may model the track quality of EOIR, RADAR, and Quantum sensors. Additional details regarding models, systems, and methods for tracking the trajectory and/or flight path of an object are described in US Patent Application Publication No. 20220065587A1, the entire contents of which are incorporated herein by reference.

FIG. 1 is a diagram showing a solar system view 100 including the Sun 102, Earth 104, and Moon 106 where an object 108, e.g., a spacecraft, is in cislunar orbit along a trajectory and/or flight path 110 with respect to the Moon 106. View 100 also shows satellites 112 and 114 in orbit around the Earth 104. Such satellites 112 and 114 may include target and/or object tracking sensors such as at least one of an EOIR sensor, RADAR sensor, and quantum RADAR sensor. One or more sensors may be located on the surface of the Earth 104 and/or Moon 106. One or more sensors may be located in space such as at Lagrange point 116, e.g., $L_1$ and/or at Lagrange point 118, e.g., $L_2$. Lagrange points are positions in space where objects can remain stationary because the gravitational fields of the primary bodies 102, 104, and 106 substantially compensate for each and/or cancel each other out.

Figure 2:
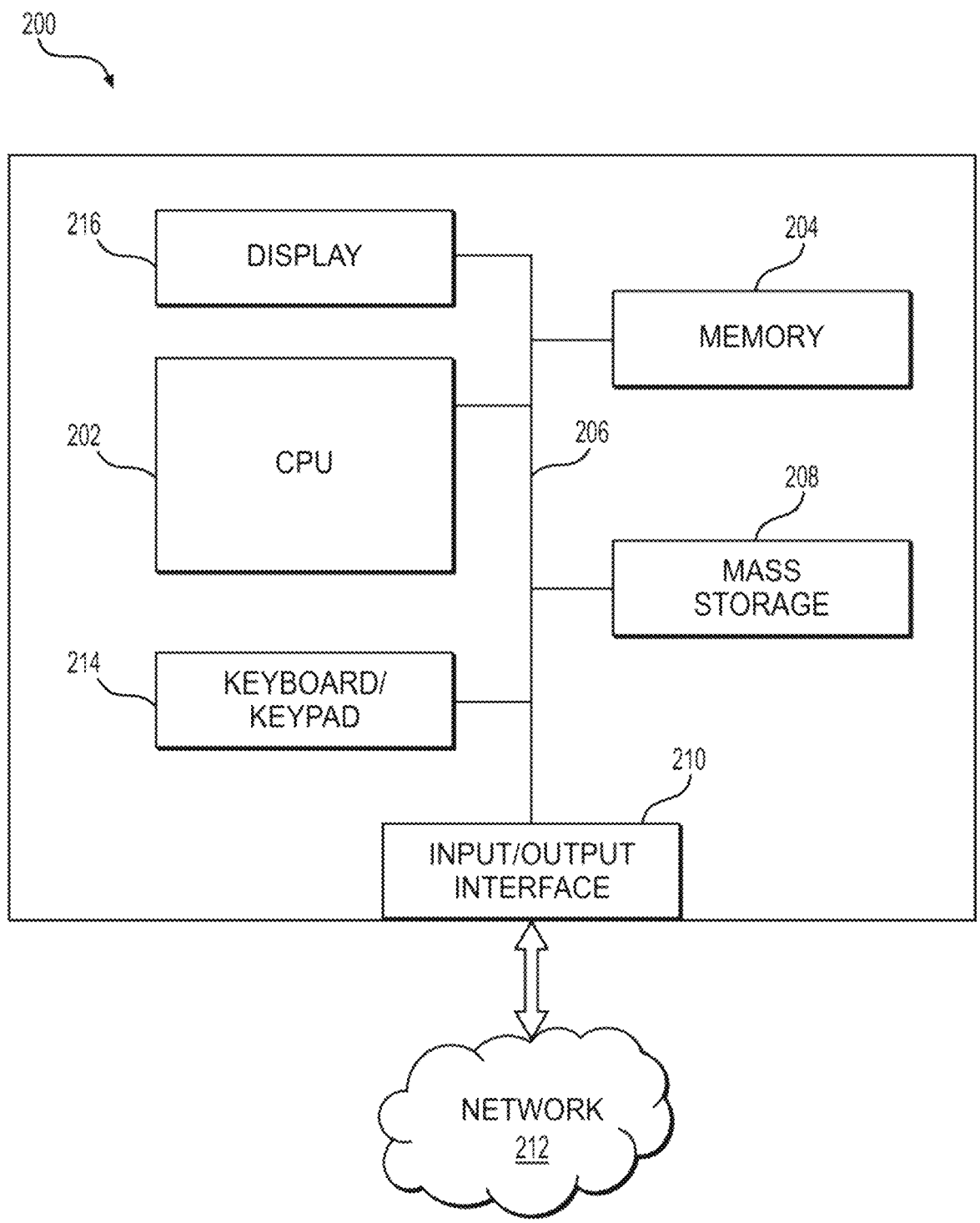
FIG. 2 shows a diagram of a computer system arranged to perform function associated with an interactive object trajectory prediction system.
Figure 3:
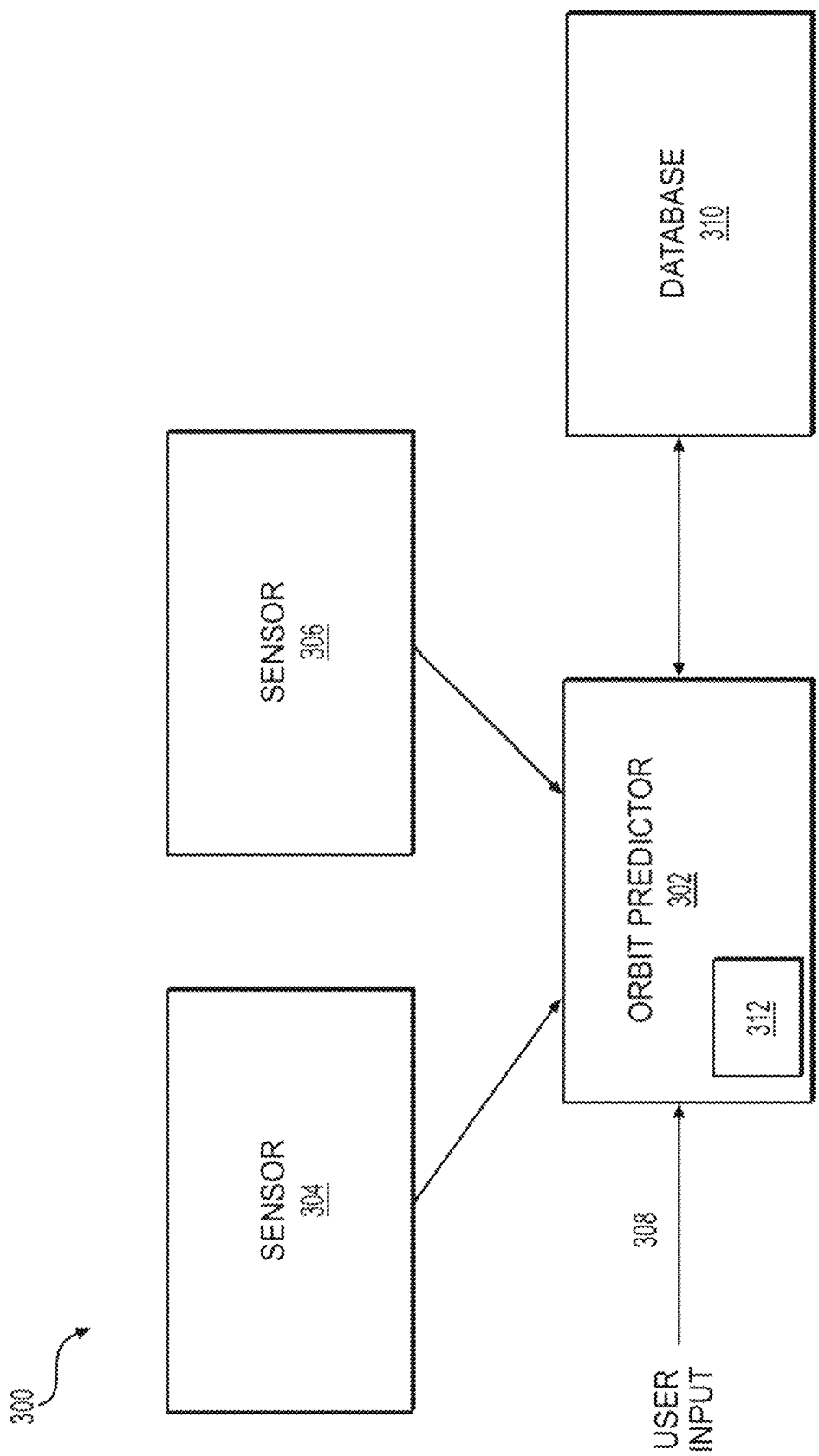
FIG. 3 shows a block diagram of an interactive object trajectory prediction system.

FIG. 2 shows a diagram of a computer system arranged to perform function associated with an interactive object trajectory prediction system, including functions associated with system 300 and/or processor 302 of FIG. 3. The computer system 200 may be implemented as a virtual machine or a physical machine. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random-access memory (DRAM) and high-speed cache memory. In operation, memory 204 stores at least portions of instructions and data for execution by the CPU 202. The memory 204 may also contain computing elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid-state memories, for storing data and instructions for use by the CPU 202. At least one component of the mass storage system 208, preferably in the form of a non-volatile disk drive, solid state, or tape drive, stores a database used for processing data and controlling functions associated with receiving user inputs and/or display data associated with an object trajectory prediction system such as system 300. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212 and/or 118. The data interface 210 may be a modem, an Ethernet card or any other suitable data communications device. To provide the functions of a processor according to FIG. 3, the data interface 210 may provide a relatively high-speed link to a network 212, such as an intranet, internet, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed object trajectory prediction operations. Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216, computer mouse, and keyboard 214 or the like serving as a local user interface for programming and/or data retrieval purposes. A mousing may enable a user to position a pointer over a selectable icon and/or button on display 216 to enable the user to make selections and/or configure an object trajectory prediction system to implement a tracking model and/or display selected graphical or other data associated with tracking an object. The display 216 may include a touch screen capability to enable users to interface with the system 200 by touching portions of the surface of the display 216. Server operations personnel may interact with the system 200 for controlling and/or programming the system from remote terminal devices via the network 212 and/or 118.

The computer system 200 may run a variety of application programs and store associated data in a database of mass storage system 208. One or more such applications may include an object trajectory prediction system according to FIG. 3. The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as system 300. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, Visual BASIC, HDL, VHDL, and/or one or more versions of Verilog. Certain script-based programs may be employed such as XML, WML, PHP, and so on. The system 200 may use a digital signal processor (DSP).

As stated previously, the mass storage 208 may include a database. The database may be any suitable database system, including the commercially available or open-source products, such as, but not limited to, Microsoft Access, Sybase, SQL Server, MongoDB, SqlLite. The database can be implemented as a local or distributed database system. The database may be supported by any suitable persistent data memory, such as a hard disk drive, RAID system, tape drive system, floppy diskette, or any other suitable system. The system 200 may include a database that is integrated with the system 100 or 300, however, it will be understood that, in other implementations, the database and mass storage 208 can be an external element. The database may include object trajectory and/or flight path files, filter modules, sensor modules, and one or more flight path models and/or algorithms associated with system 300.

In certain implementations, the system 200 may include an Internet browser program and/or be configured to operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 200 and/or 300 includes a networked-based, e.g., Internet-based, application that may be configured and run on any combination of the other components of system 200 and/or 300. The computer system 200 may include a web server running a Web 2.0 application or the like. Web applications running on system 100 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 200 and/or 300 may include applications that employ Verilog HDL, VHDL, asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 300 and/or computer system 200 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

FIG. 3 shows a block diagram of an interactive object trajectory prediction system 300 including an interactive orbit predictor 302, sensors 304 and 306, database 310, and user interface 312. Predictor 302 may receive sensor data from one or more sensors such as sensor 304 and 306 in real-time or at any time. Sensor data including, for example, trajectory information associated with an object, may be processed in real-time by a processor, e.g. computer system 200 of FIG. 2, of predictor 302 or processed at a later time by predictor 302. Database 310 may include, for example, a database associated with mass storage 208 and/or memory 204, as described with respect to FIG. 2. Database 310 may store, without limitation, orbit type data, orbit family data, hemispheres data of one or more primary bodies, sensor module data, sensor module type data, tracking quality of sensors data, sensor module configuration data, target and/or object trajectory data and/or files, tracking models such as a CR3B model, model filter configuration data, track quality data, track quality post processing data, spectral quantum efficiency data, spectral transmissivity data, viewing point source transmission (PST) data, primary body exclusion angles data, false alarm rate (FAR) data, sky background brightness configuration data, cloud clutter model configuration data, target-sensor SNR data, target-sensor detectability data and/or probably detection (Pd) data, and constraints data.

User interface 312 may receive user inputs, selections, and/or configuration instructions 308 from a user while configuring predictor 302 to perform trajectory and/or flight path predictions. User interface 312 may include a display such as display 216 arranged to display information to a user such as shown in FIGS. 4-10 and/or receive user inputs via, for example, a touch screen, mouse pointer, and/or keyboard 214. Sensors 304 and/or 306 may be positioned on a satellite, ground station, or vehicle on the surface of a primary body or in space. A sensor may include a EOIR sensor, RADAR sensor, and/or a quantum RADAR sensor.

Interactive orbital and/or trajectory predictor 302 may include a processor, such as system 200 and/or CPU 202, arranged to simultaneously display on a display 216: i) a surface of a primary body such as the Moon 106 including a predicted trajectory and/or flight path 110 of an object, such as spacecraft 108, orbiting the primary body and ii) a barycentric reference frame with the primary body as the center focus and the trajectory and/or flight path 110 of the object 108 within the barycentric reference frame. Predictor 302 may include an input device of a user interface 312 arranged to receive a user selection 308 of a first sensor module of a plurality of sensor modules used to predict the trajectory and/or flight path 110 of the object 108 orbiting the primary body such as the Moon 106. The processor, in response to the user selection 308 of the first sensor module, may predict the trajectory and/or flight path 110 of the object based in part on the first sensor module.

Predictor 302 may include a data interface such as interface 210 that is arranged to receive object position data from one or more object position sensors such as sensors 304 and 306. The processor of predictor 302 may then predict the trajectory and/or flight path 110 of the object 108 based in part on the object position data and/or a selected sensor module. The one or more object position sensors 304 and 306 may be located on the primary body that the object is orbiting, on another primary body, or in space. The displayed barycentric reference frame may display the locations of the one or more position sensors 304 and/or 306.

The processor, e.g., system 200 and/or CPU 202, may be arranged to simultaneously display on the display 216 object SNR from at least one of the one or more position sensors 304 and/or 306. The first sensor module may include an electro optical/infrared (EOIR) module, a RADAR module, and/or a quantum RADAR module. The modules may be stored in database 310. The primary body may be the Moon, Earth, Mars, another moon, and/or another planet. The orbital trajectory prediction system 300 may include a cislunar orbit prediction system. The surface of the primary body may be displayed in a two-dimensional and/or three-dimensional format. The barycentric reference frame may be displayed in a three-dimensional format. The object may include a spacecraft, satellite, space debris, a star, a planet, a meteor, a comet, ballistic missile, subsonic missile, supersonic missile, hypersonic missile, or cruise missile.

A predicted trajectory of a target may be output by predictor 302 to a guidance system of a vehicle such as a spacecraft or satellite to enable the vehicle to avoid a collision with the target or enable intercept for docking or inspection. Predictor 302 may output a predicted trajectory of a target to a guidance system of a missile or fire control system of, for example, a laser system, to enable intercept and/or neutralization of the target.

Figure 4:
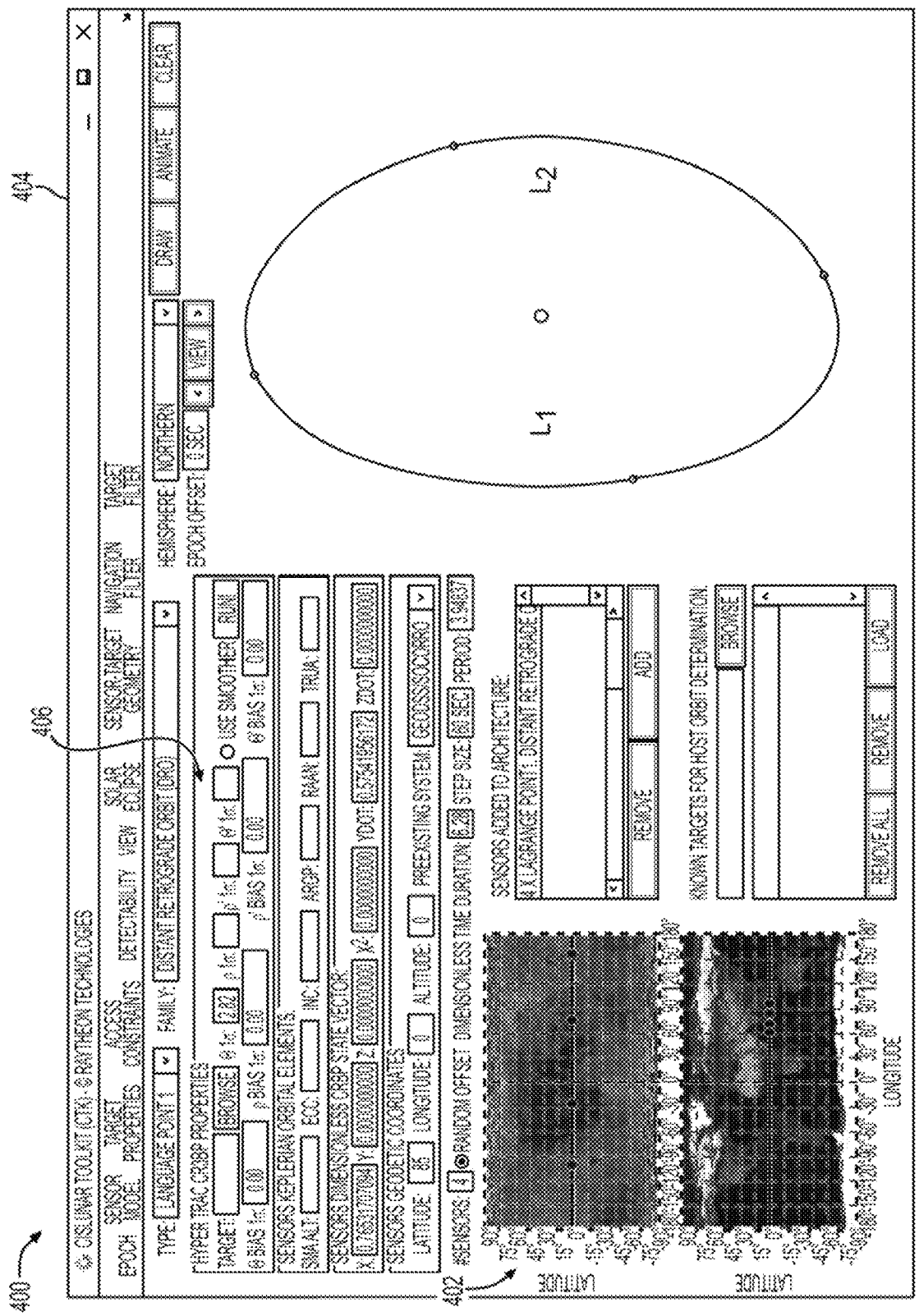
FIG. 4 shows a screen shot of a user interface display showing set up of an object trajectory prediction system using the circular restricted Three-Body (CR3B) tracking model.

FIG. 4 shows a screen shot 400 of a user interface display showing set up of object trajectory prediction system 300 and/or predictor 302 using the circular restricted 3 body (CR3B) tracking model. Screen shot 400 includes a first region 402 including two-dimensional topographical images of the surface of one or more primary bodies, e.g., the Moon 106 and/or Earth 104. Screen shot 400 also includes a second region 404 including a three-dimensional image of a barycentric reference frame where the center may be located at the primary body. Screen shot 400 also includes a third region 406 including multiple input buttons, drop down menus, and/or input fields arranged to enable a user to configure various functions of predictor 302. A user may perform steps to configure the predictor 302 to use a CR3B model to predict the flight path and/or trajectory of an object such as: select an orbit path; select an orbit family; select a hemisphere; and select a number of satellites and/or sensors. Second region 404 shows four satellites in the barycentric reference frame which corresponds to the selection of four satellites.

Figure 5:
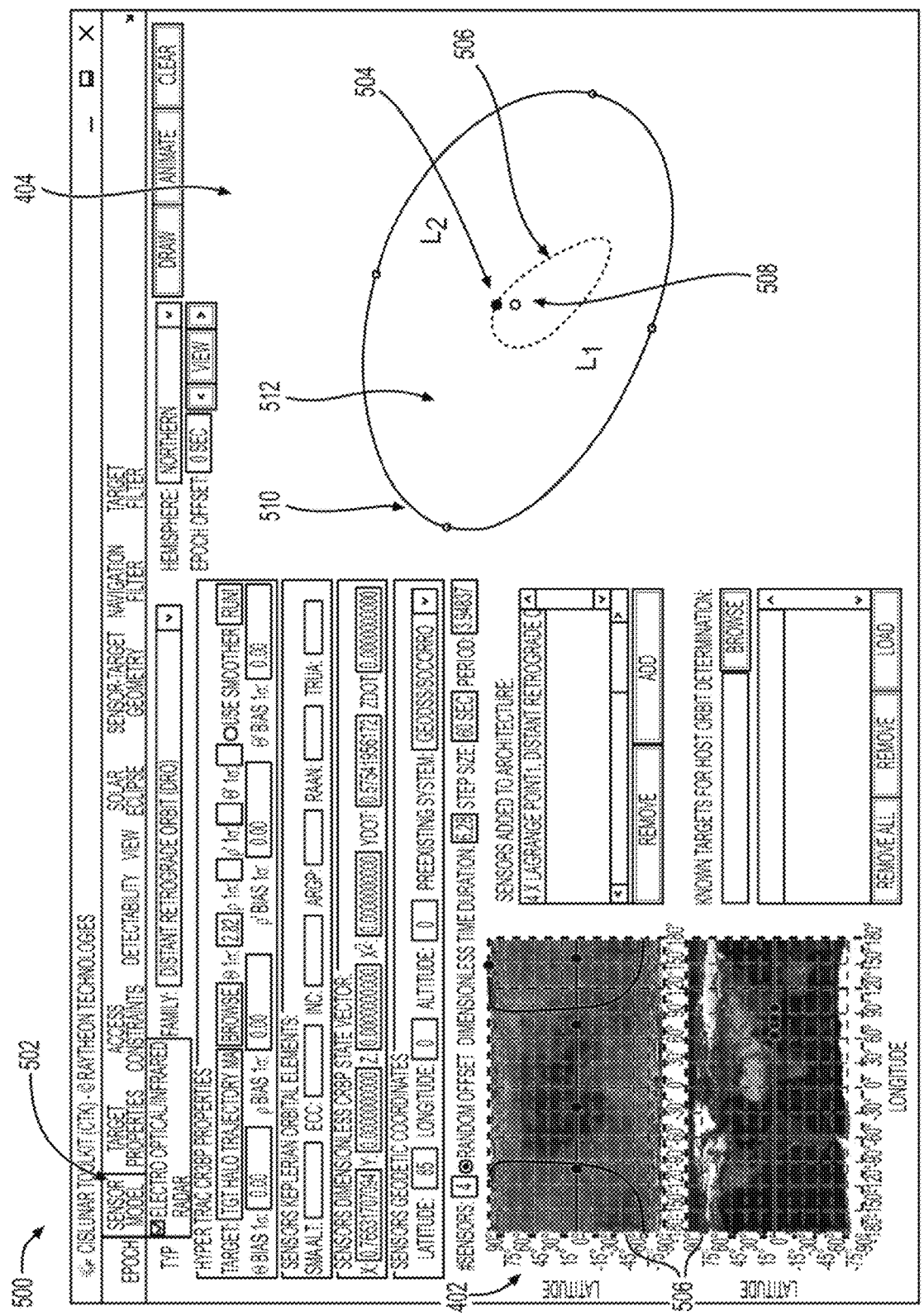
FIG. 5 shows a screen shot of the user interface display while a user selects the EOIR sensor module.

FIG. 5 shows a screen shot 500 of the user interface display while a user selects the EOIR sensor module to track an object and/or target using EOIR sensors associated with, for example, the four satellites selected with respect to FIG. 4. Screen shot 500 shows drop down menu 502 that enables a user to select the EOIR sensor module. The first region 402 shows the predicted trajectory 506 of object 504 in relation to the surface of the Moon 106 while second region 404 shows the trajectory 506 of object 504 as it orbits the Moon 508. The first region 402 may also show the trajectory 506 of object 504 in relation to the surface of a second or more primary body such as, for example, the Earth 104. Second region 404 also shows the position of four satellites surrounding the Moon and/or center reference point 508 including satellites 510 and 512 which include, for example, sensors 304 and 306 of system 300 respectively. A user may perform steps to configure predictor 302 to use the EOIR sensor module to predict the flight path and/or trajectory 506 of object 504 such as: select sensor module menu and select EOIR sensor module.

Figure 6:
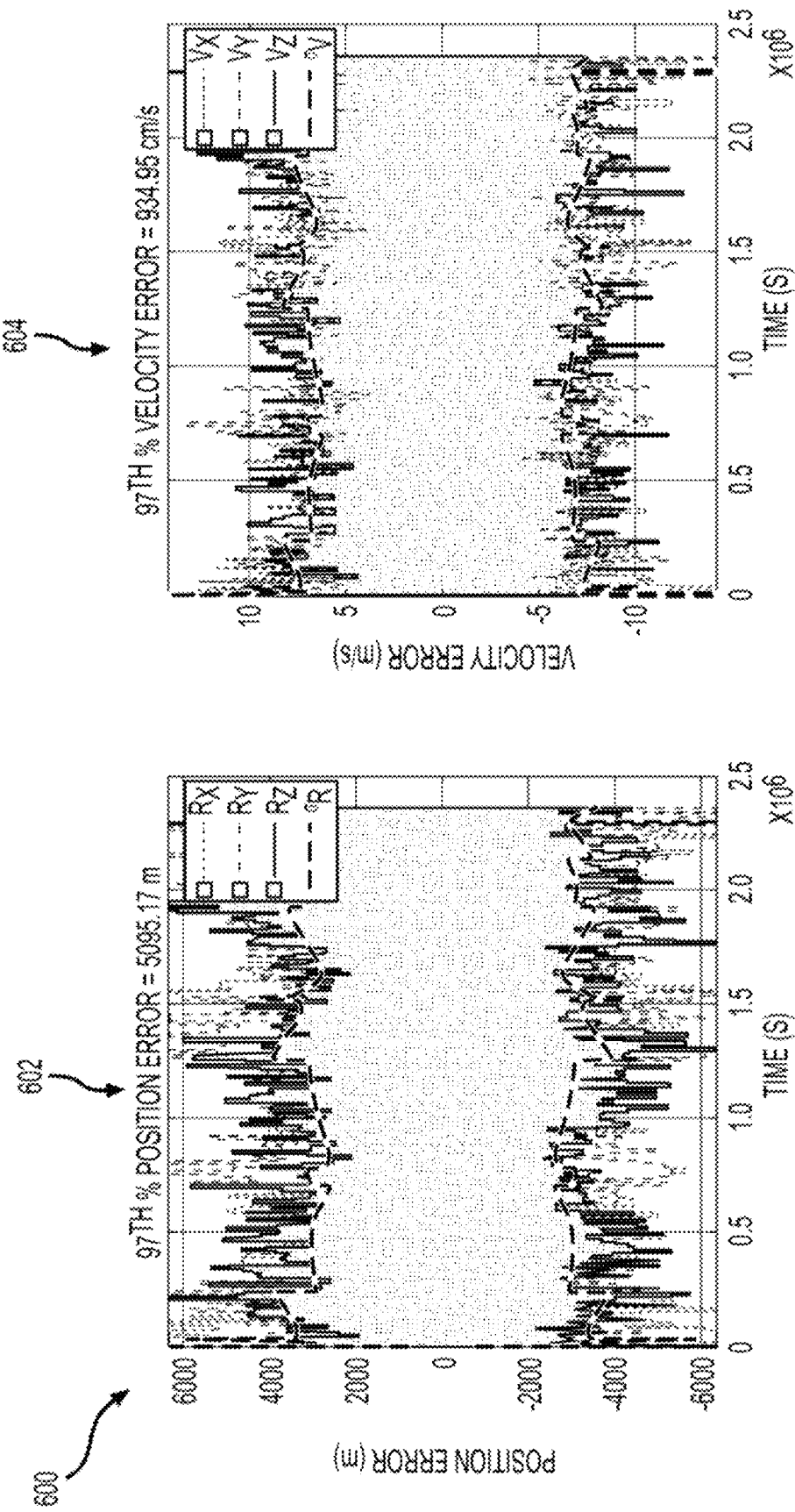
FIG. 6 shows a screen shot of the user interface display while displaying a second display page in response to a user selection where the display page provides a graphical display of EOIR track quality results.

FIG. 6 shows a screen shot 600 of the user interface display while displaying a second display page in response to a user selection where the display page depicts the EOIR track quality results. Plot 602 shows position error in the X, Y, and Z directions along with an average error over a period of time. Plot 604 shows velocity error in the X, Y, and Z directions along with an average error over a period of time. Plots 602 and 604 may provide a user with an understanding of the accuracy and/or reliability of a predicted flight path and/or trajectory of a target object.

Figure 7:
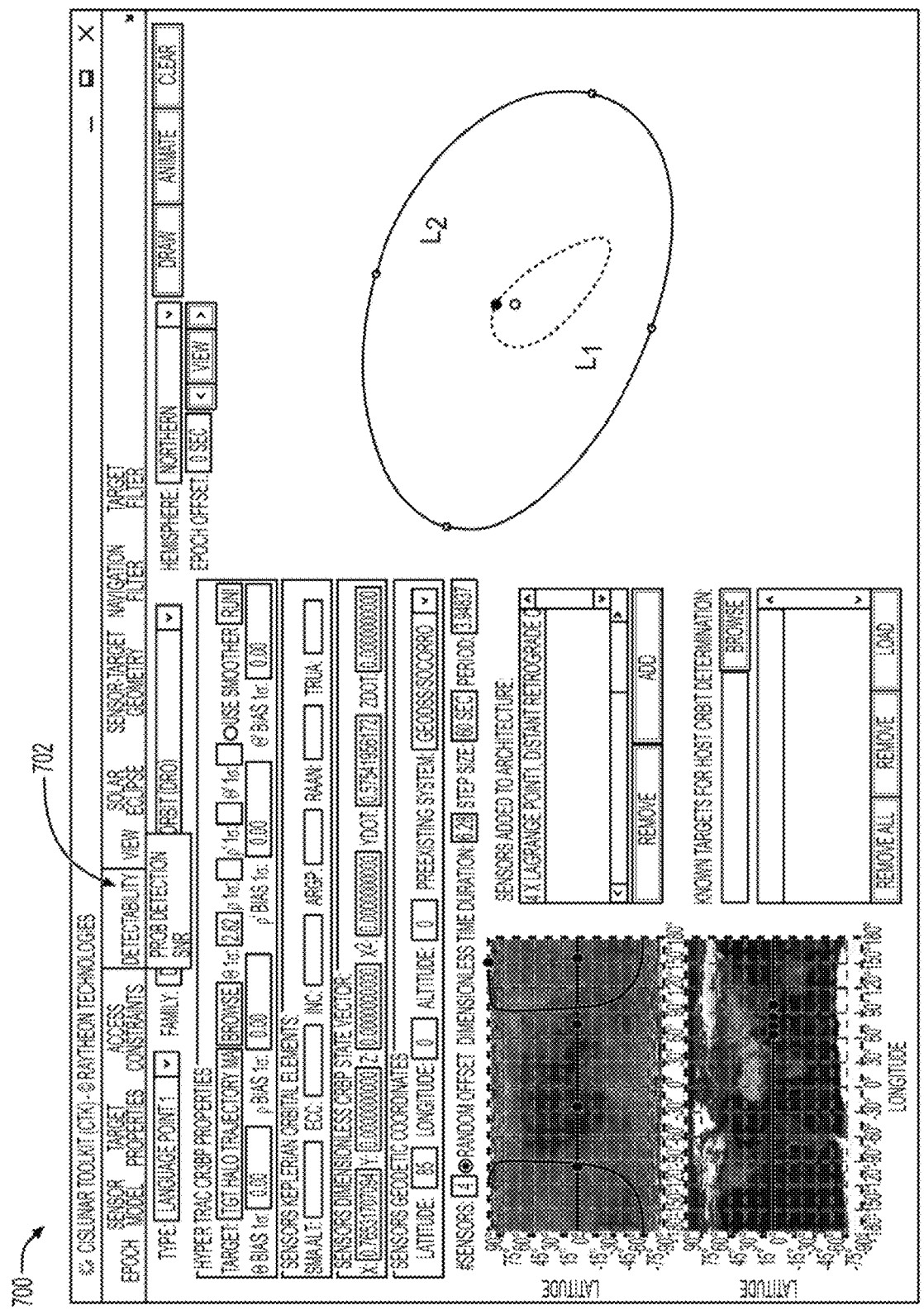
FIG. 7 shows a screen shot of the user interface display while displaying SNR information of each sensor in a fourth region of the display.

FIG. 7 shows a screen shot 700 of the user interface display configured by user input 702 to display the SNR associated with four satellites over a period of time in the fourth region of the display. The four plots provide an understanding of the accuracy and/or reliability of the sensed location and/or trajectory of a target object. A user may perform exemplary steps to configure predictor 302 to display the SNR of the satellites configured to track the flight path and/or trajectory 506 of object 504 such as: detectability and SNR according to input 702.

Figure 8:
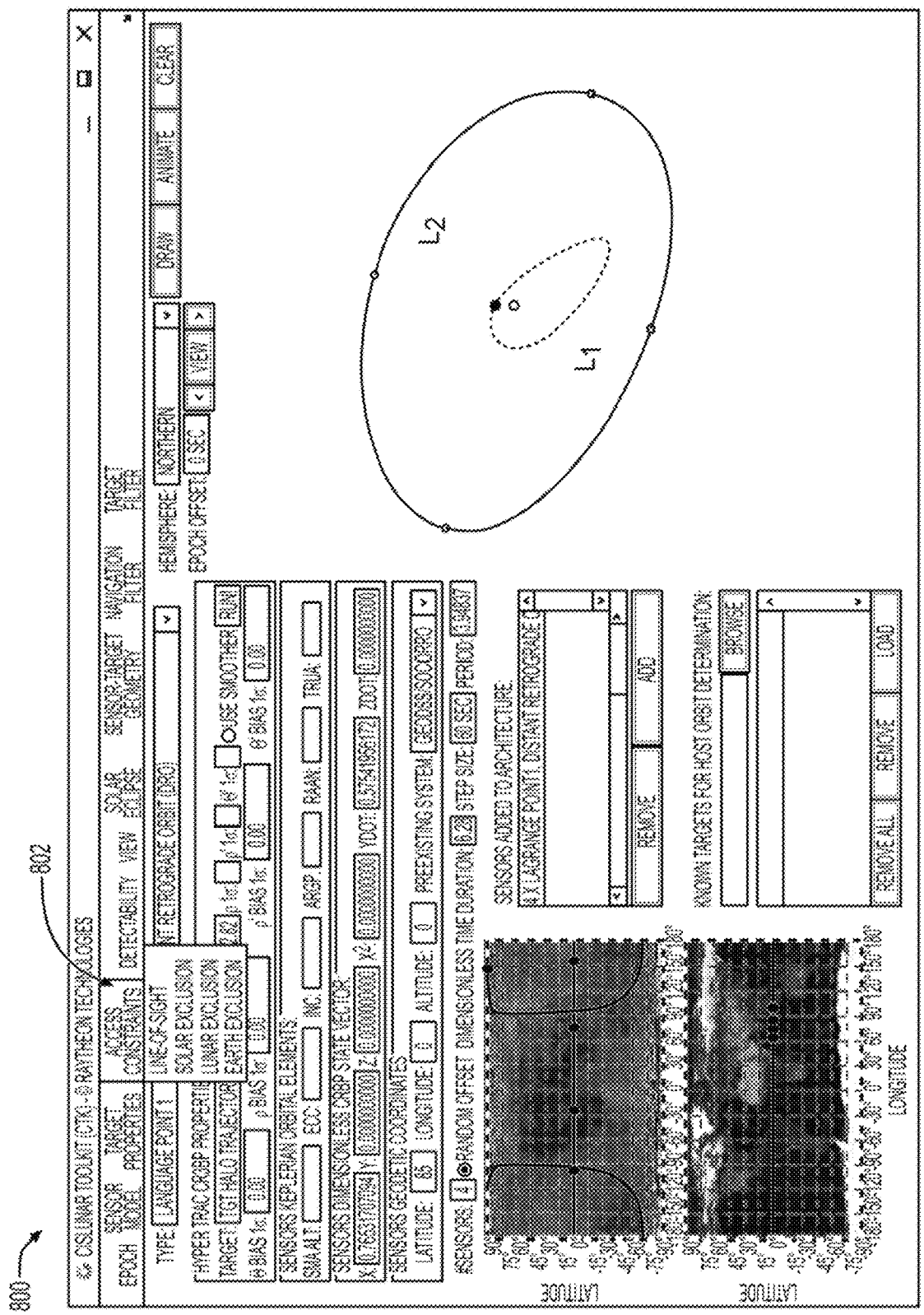
FIG. 8 shows a screen shot of the user interface display while displaying LOS constraints in a fourth region of the display.

FIG. 8 shows a screen shot 800 of the user interface display while a user configures, via a user input, predictor 302 to display line-of-sight (LOS) constraints in a fourth region and/or a second page or window of the display. A user may select drop down menu 802 to select the LOS constraint to configure predictor 302 to display the LOS constraints related to the flight path and/or trajectory 506 of object 504 such as: select access constraints and select line-of-sight. Other constraints may be selected for viewing such as solar exclusion constraints, lunar exclusion constraints, and Earth exclusion constraints, or constraints associated with another primary body.

Figure 9:
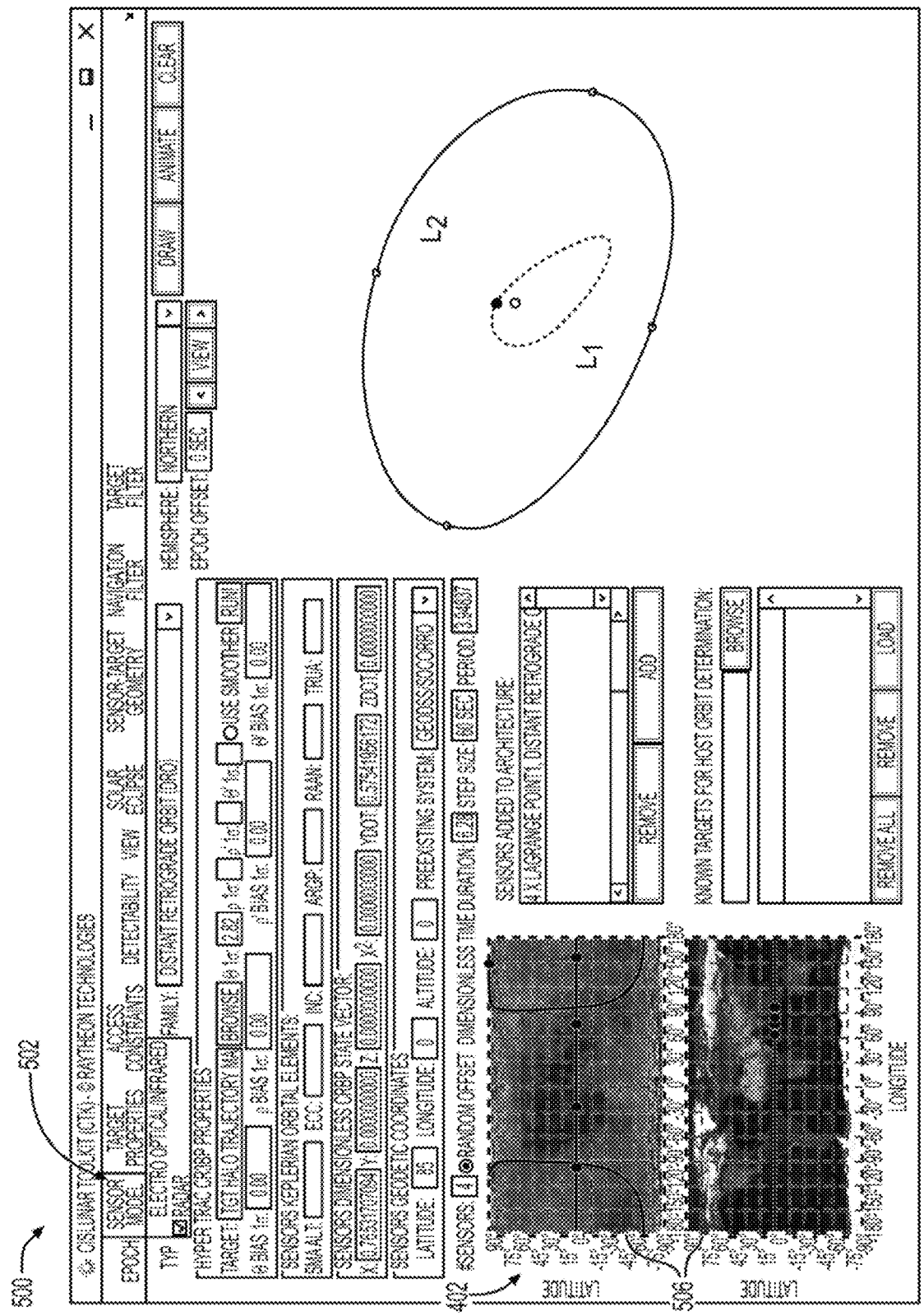
FIG. 9 shows a screen shot of the user interface display while a user selects the RADAR sensor module.

FIG. 9 shows a screen shot 900 of the user interface display while a user selects the RADAR sensor module via sensor module drop down menu 902. A user may select the RADAR module via a user input to configure predictor 302 to use a RADAR module to track the flight path and/or trajectory 506 of object 504 such as by: update angular measurement uncertainty; updated range measurement uncertainty; select sensor module; and select RADAR.

Figure 10:
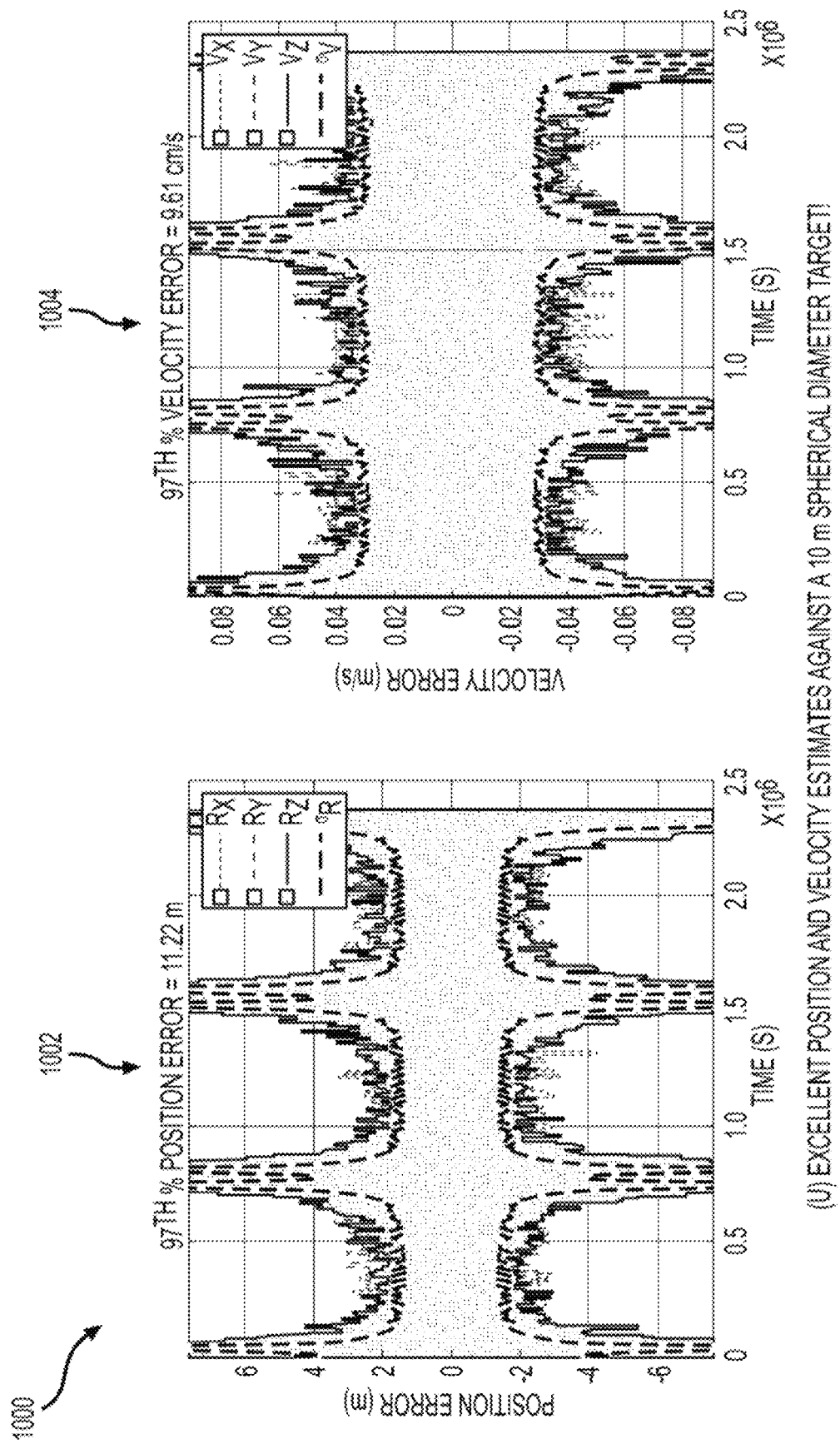
FIG. 10 shows a screen shot of the user interface display while displaying a second display page in response to a user selection where the display page provides a graphical display of RADAR track quality results.

FIG. 10 shows a screen shot 1000 of the user interface display with a second display page in response to a user selection of RADAR track quality results. Plot 1002 shows position error in the X, Y, and Z directions along with an average error over a period of time. Plot 1004 shows velocity error in the X, Y, and Z directions along with an average error over a period of time. Plots 1002 and 1004 may provide a user with an understanding of the accuracy and/or reliability of a predicted flight path and/or trajectory of a target object.

Figure 11:
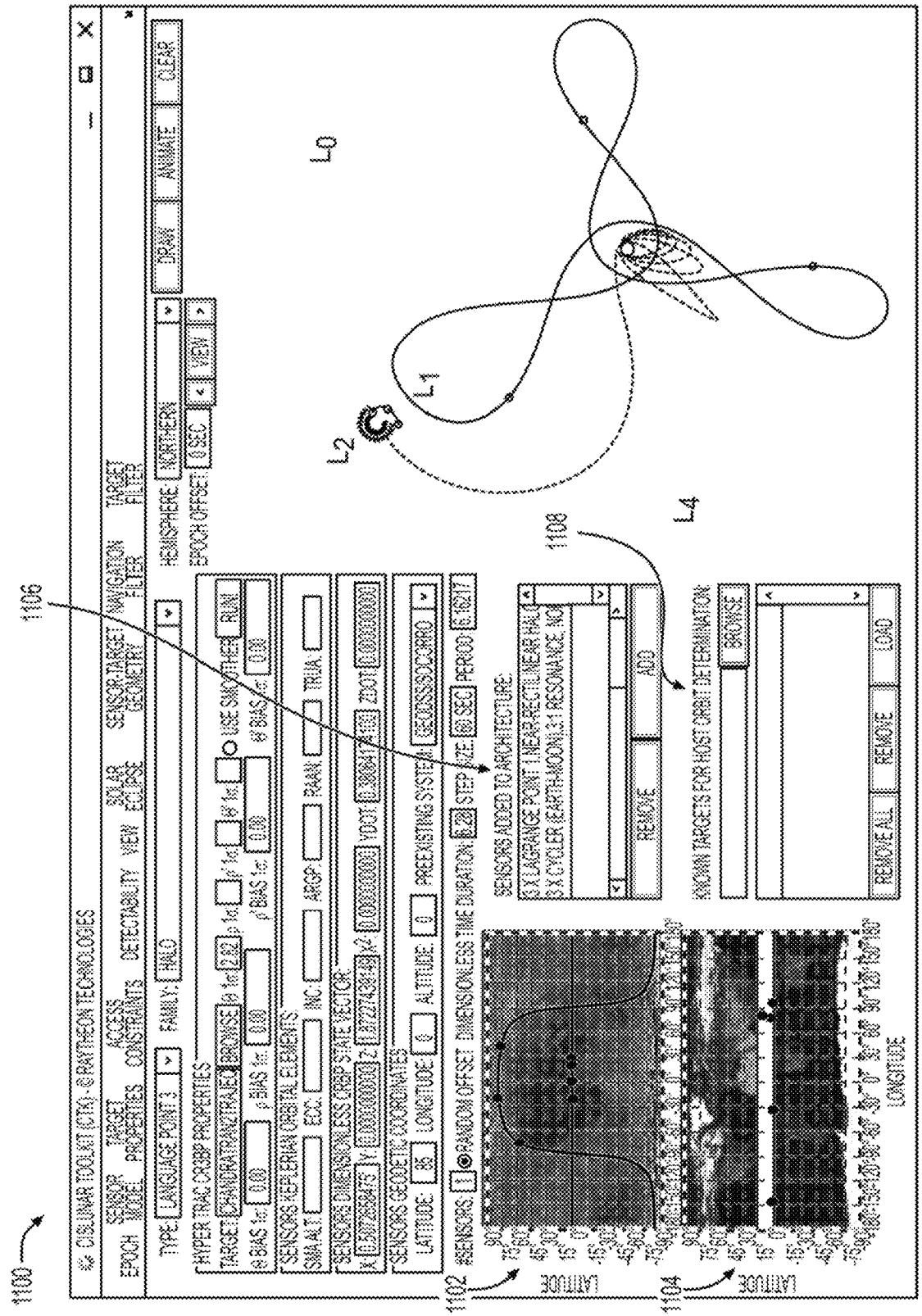
FIG. 11 shows a screen shot of the user interface display while displaying the surface of a first primary body and a second primary body.

FIG. 11 shows a screen shot 1100 of the user interface display with a surface of a second primary body 1102, e.g., the Moon, and a first primary body 1104, e.g., the Earth. Predictor 302 display images of the surface of one or more primary bodies which may also show the flight path and/or trajectory of an object in relation to the surface of the one or more primary bodies. The user interface display may include a region 1106 where a user can provide a user input to add one or more observer payloads/platforms. The user interface display may include a region 1108 where a user can provide input to load targets for onboard filter navigation, e.g., of Near-Earth orbit (NEO) targets.

Figure 12:
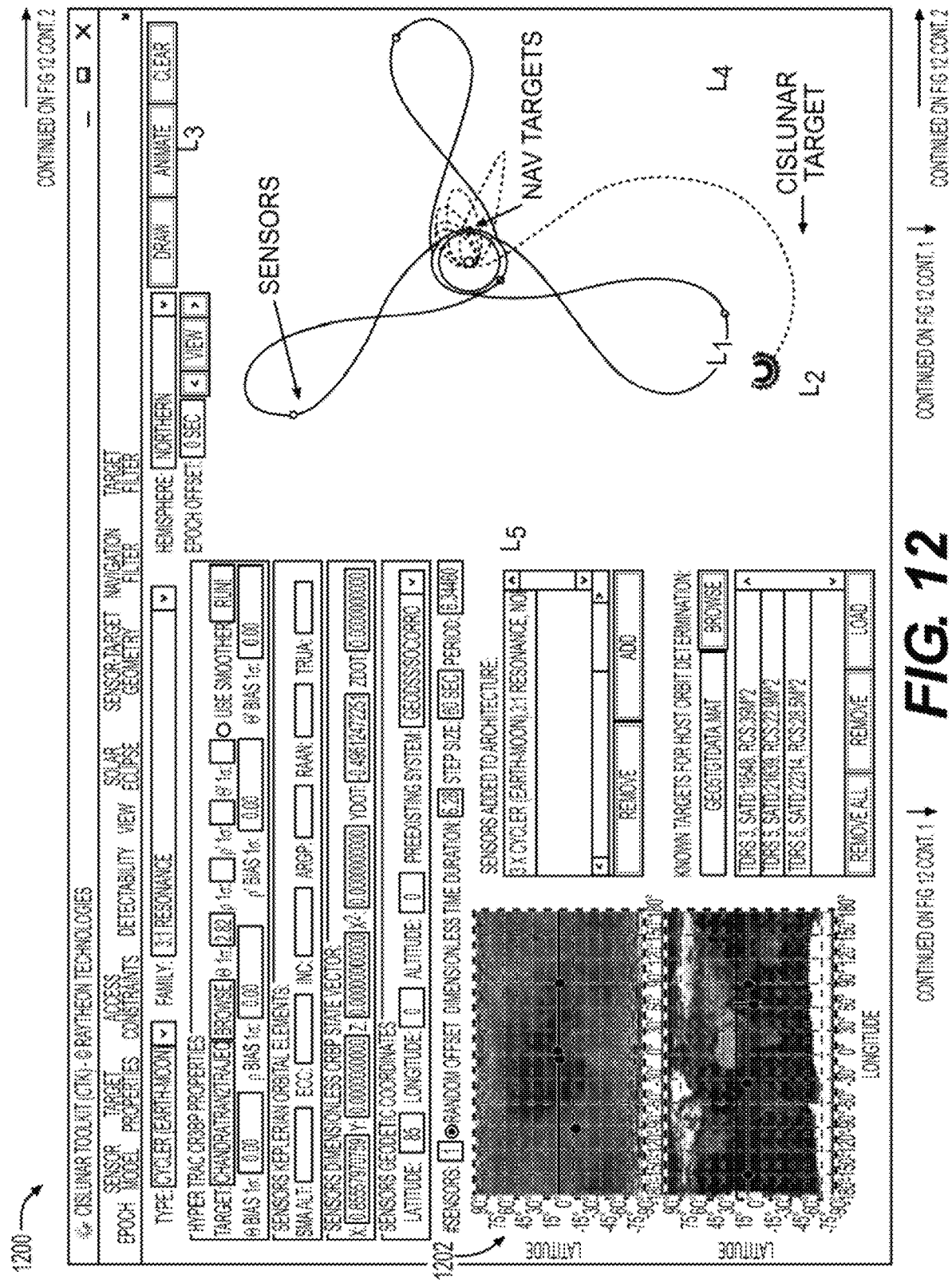
FIG. 12 shows a screen shot of the user interface display while running a predicted path simulation without a sensor module selected.
Figure 12:
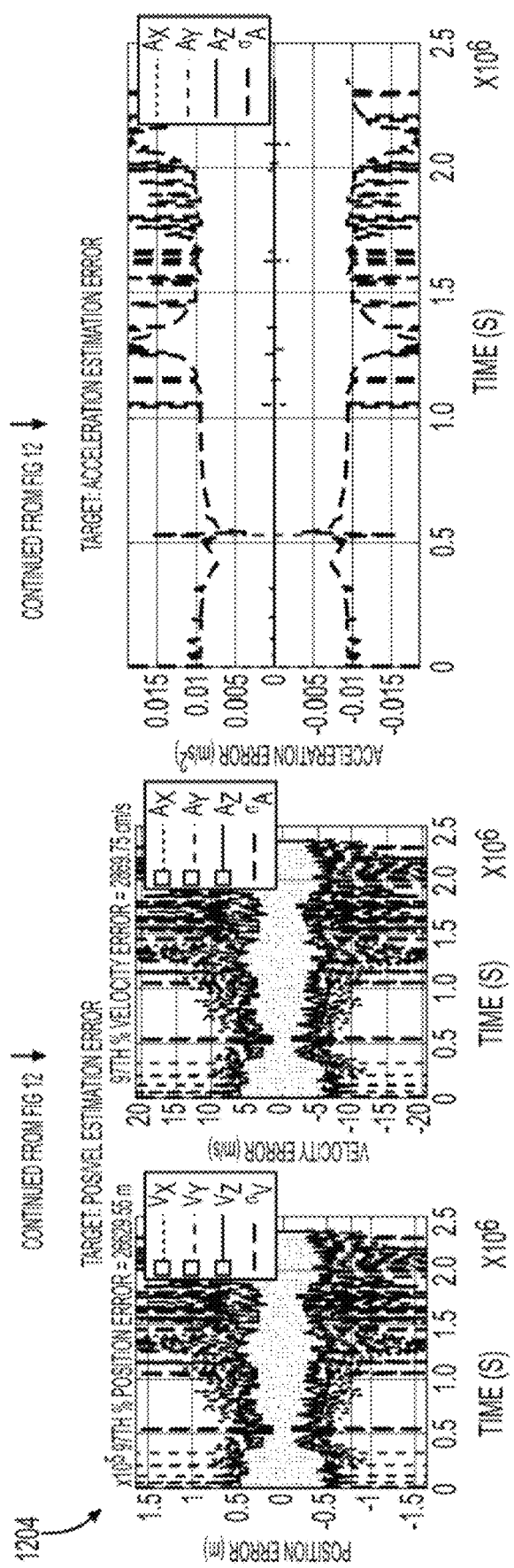
Figure 12:
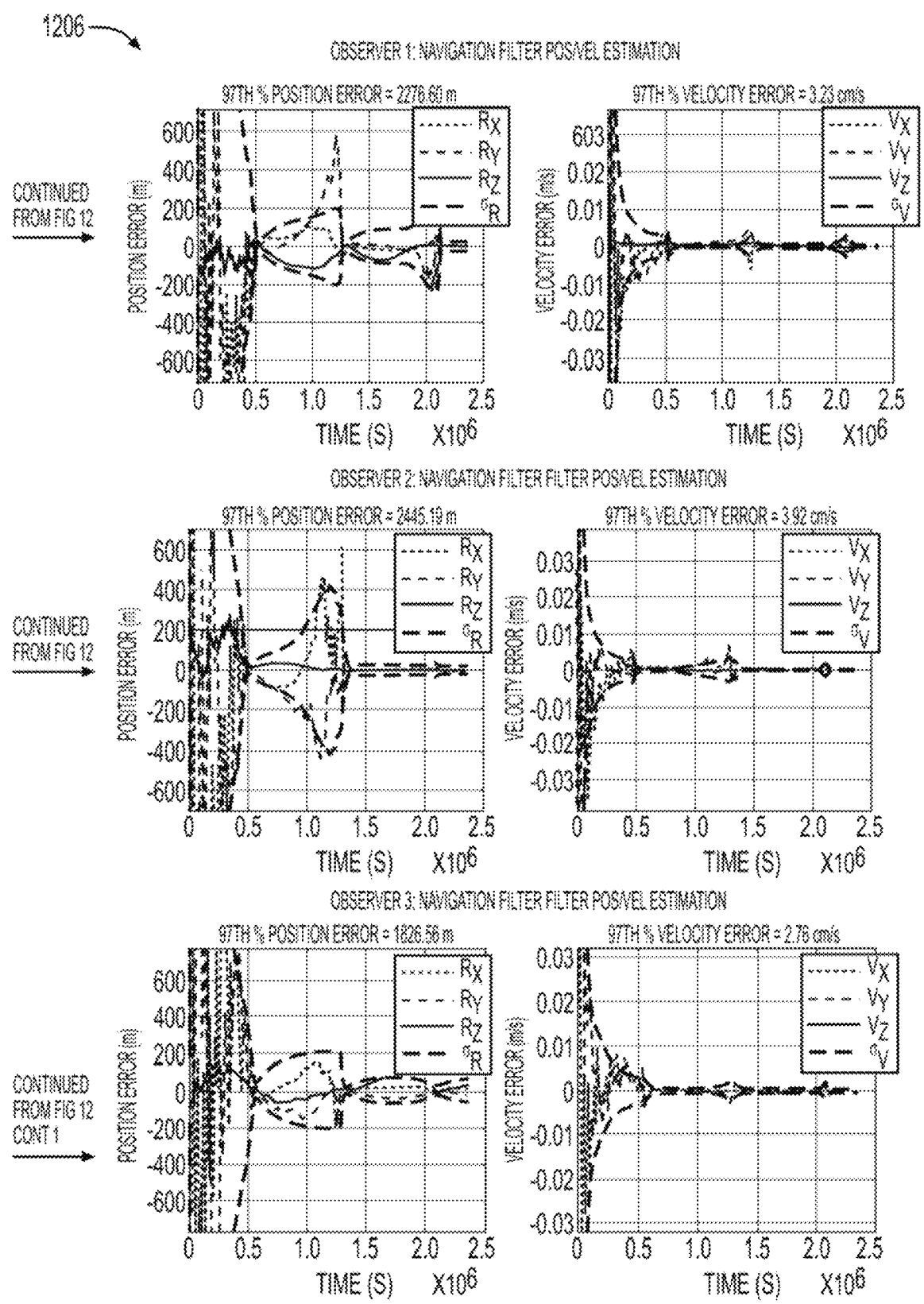

FIG. 12 shows a screen shot 1200 of the user interface display while running a predicted path simulation without a sensor module selected. The user interface display may include multiple regions where different graphical information is displayed to a user for a comprehensive understanding of an object's predicted trajectory while also providing assurance and/or understanding of the accuracy of the predicted trajectory. Region 1204 provides graphical plots of target position errors, velocity errors, and acceleration errors over the period of the predicted trajectory of a target object. Region 1206 provide graphical plots of observer and/or sensor navigation filter position and/or velocity estimations. Hence, the user interface display of predictor 302 can provide multiple regions simultaneous displaying graphical data associated with different aspects an object's predicted trajectory.

Figure 13:
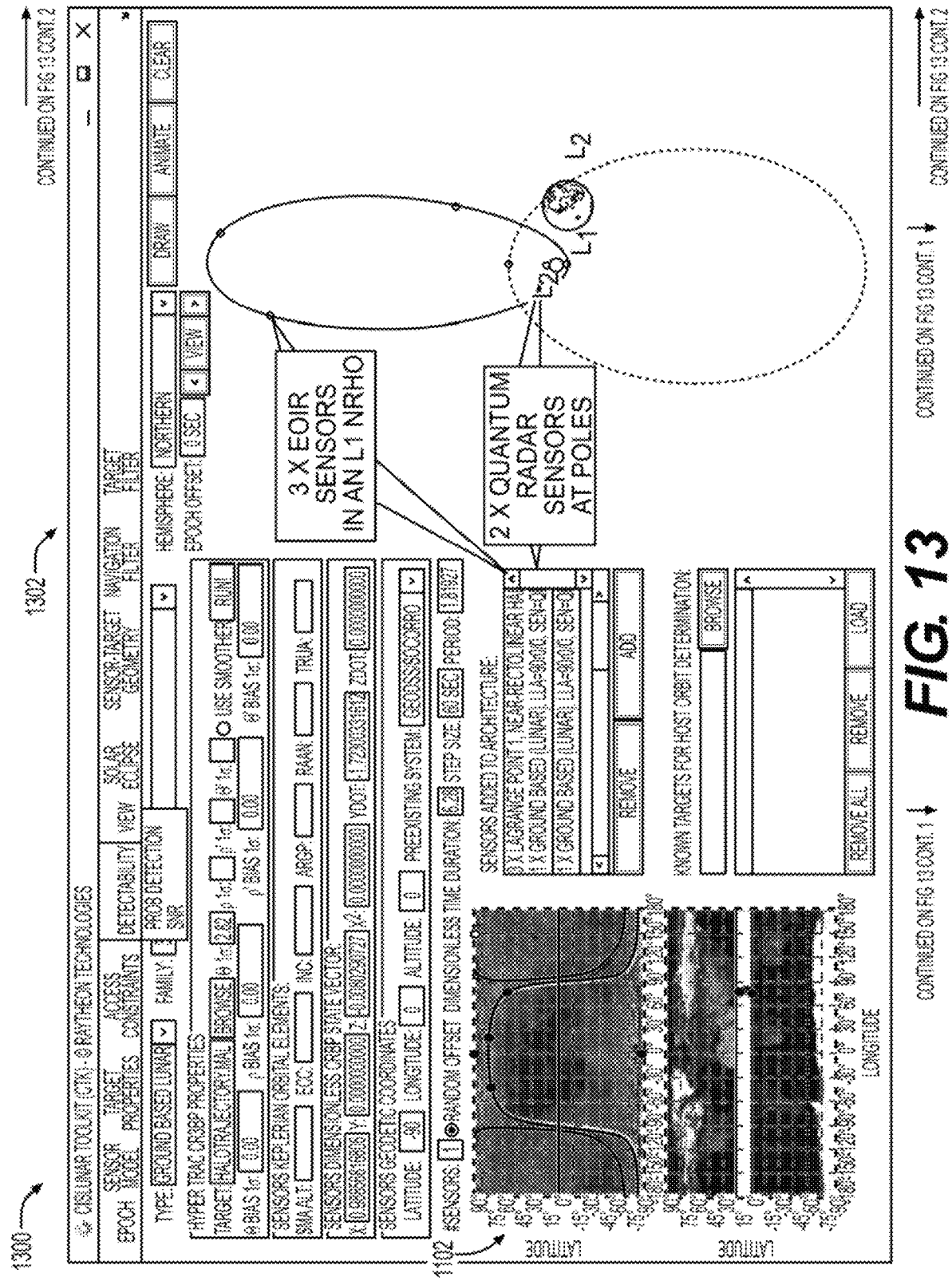
FIG. 13 shows a screen shot of the user interface display while running a predicted path simulation with lunar-based quantum RADAR sensors and space-based EOIR sensors.
Figure 13:
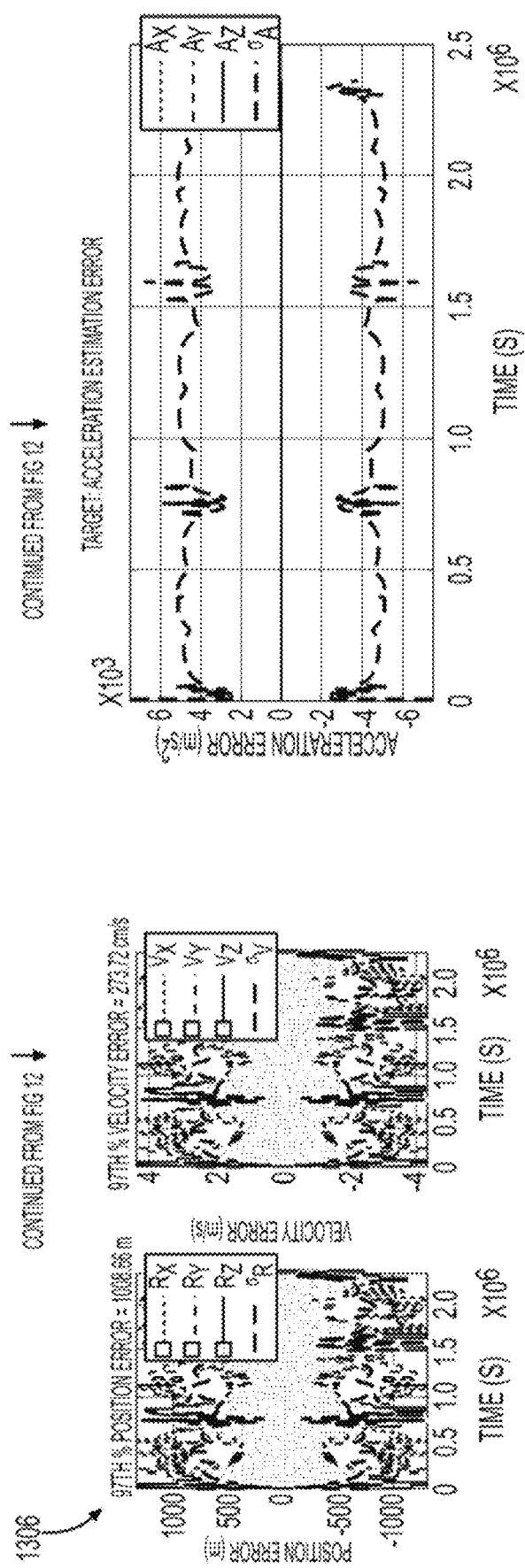
Figure 13:
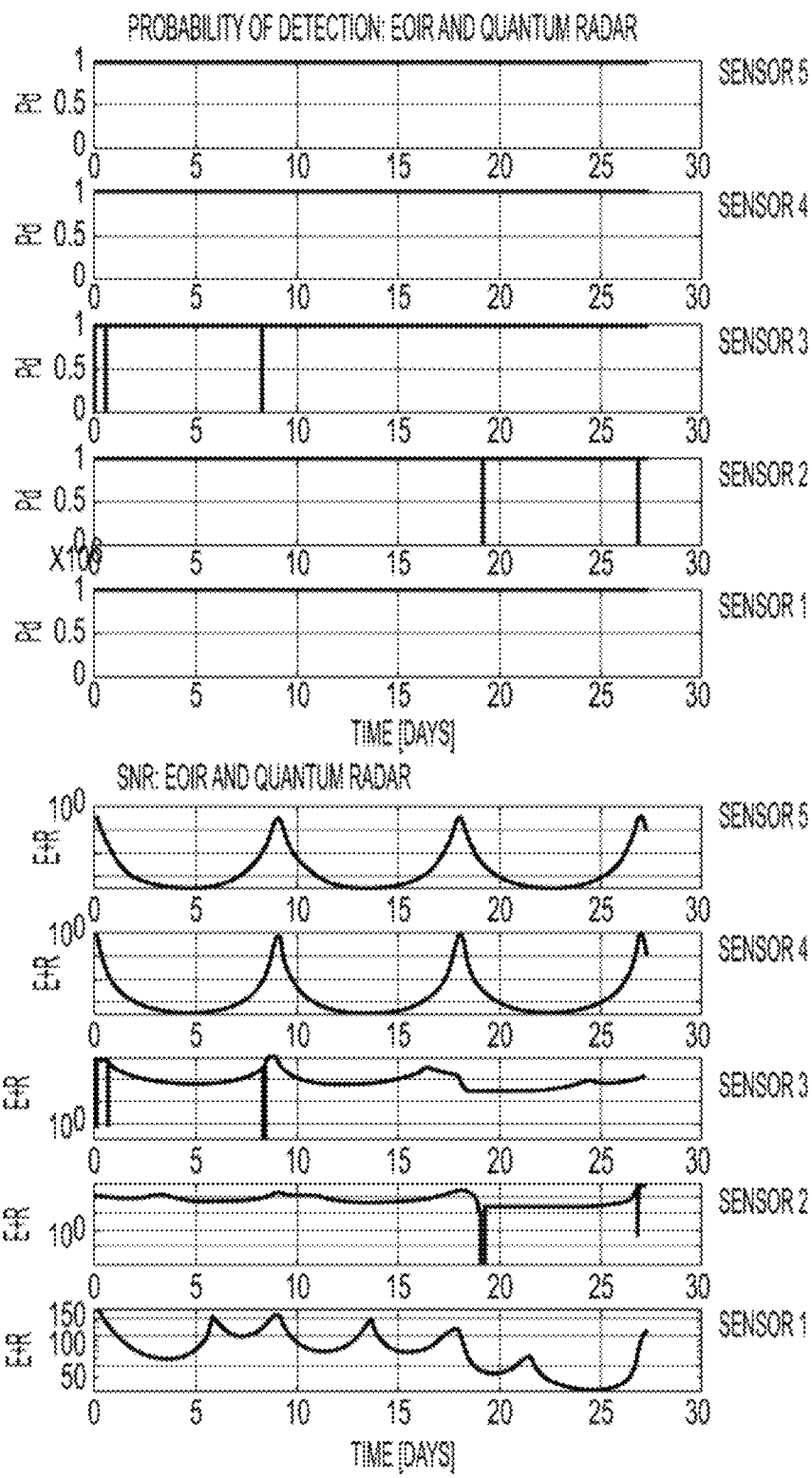

FIG. 13 shows a screen shot 1300 of the user interface display while running a predicted path simulation with lunar-based quantum RADAR sensors and space-based EOIR sensors. Region 1302 displays information similar to the information display in screen shot 1100. Region 1304 shows graphical plots of the probability of detection for EOIR and Quantum RADAR and plots of SNR for EOIR and Quantum RADAR. Region 1306 shows graphical plots of target and/or object position/velocity Estimation Error and target and/or object acceleration Estimation Error.

Figure 14:
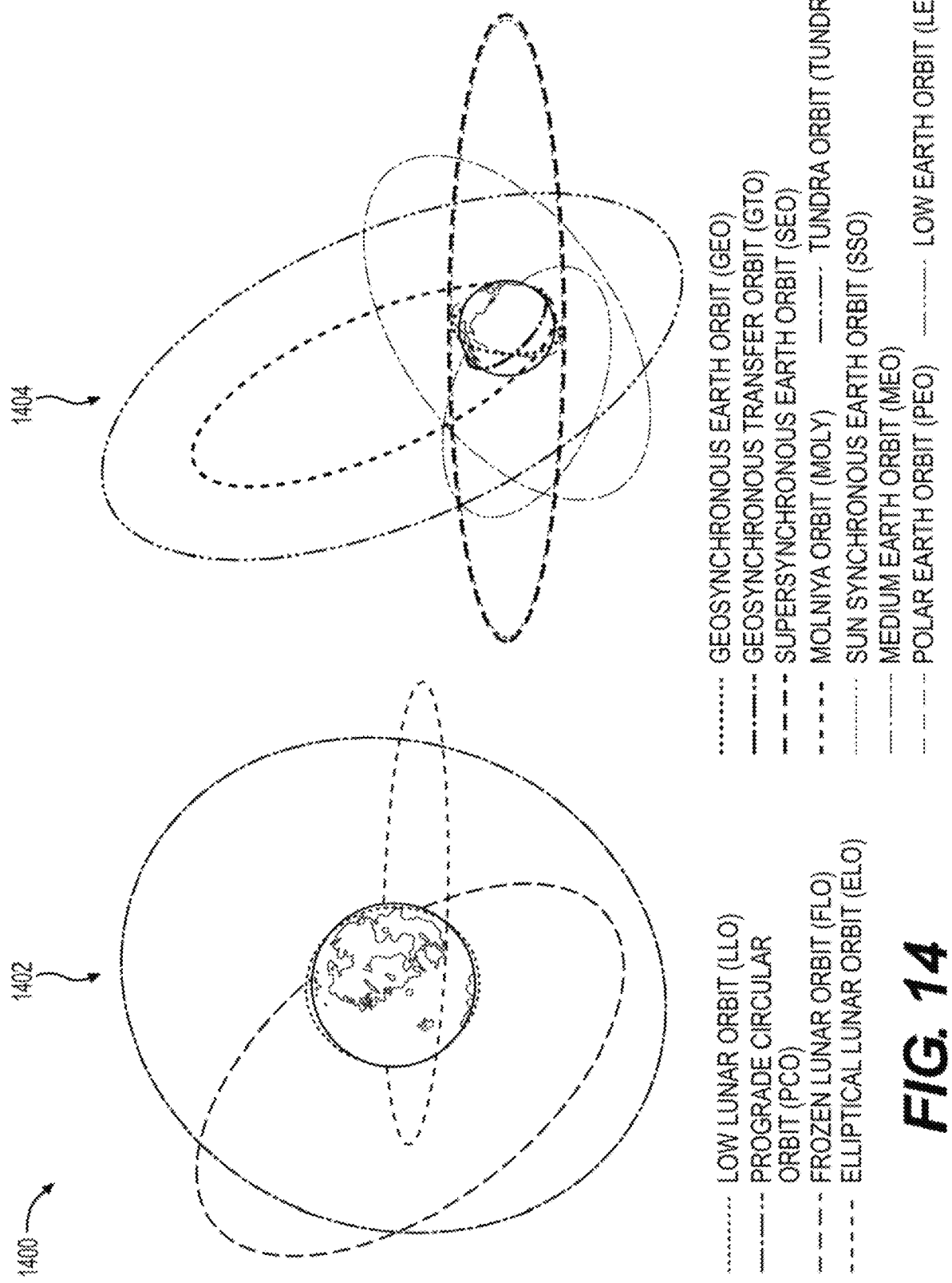
FIG. 14 shows sensor orbits around the Earth and it's Moon.

FIG. 14 shows predicted sensor orbits 1402 and 1404 around the Moon and around the Earth respectively, which may be displayed in a region of the user interface display or on a second page or window in response to a user input.

Figure 15:
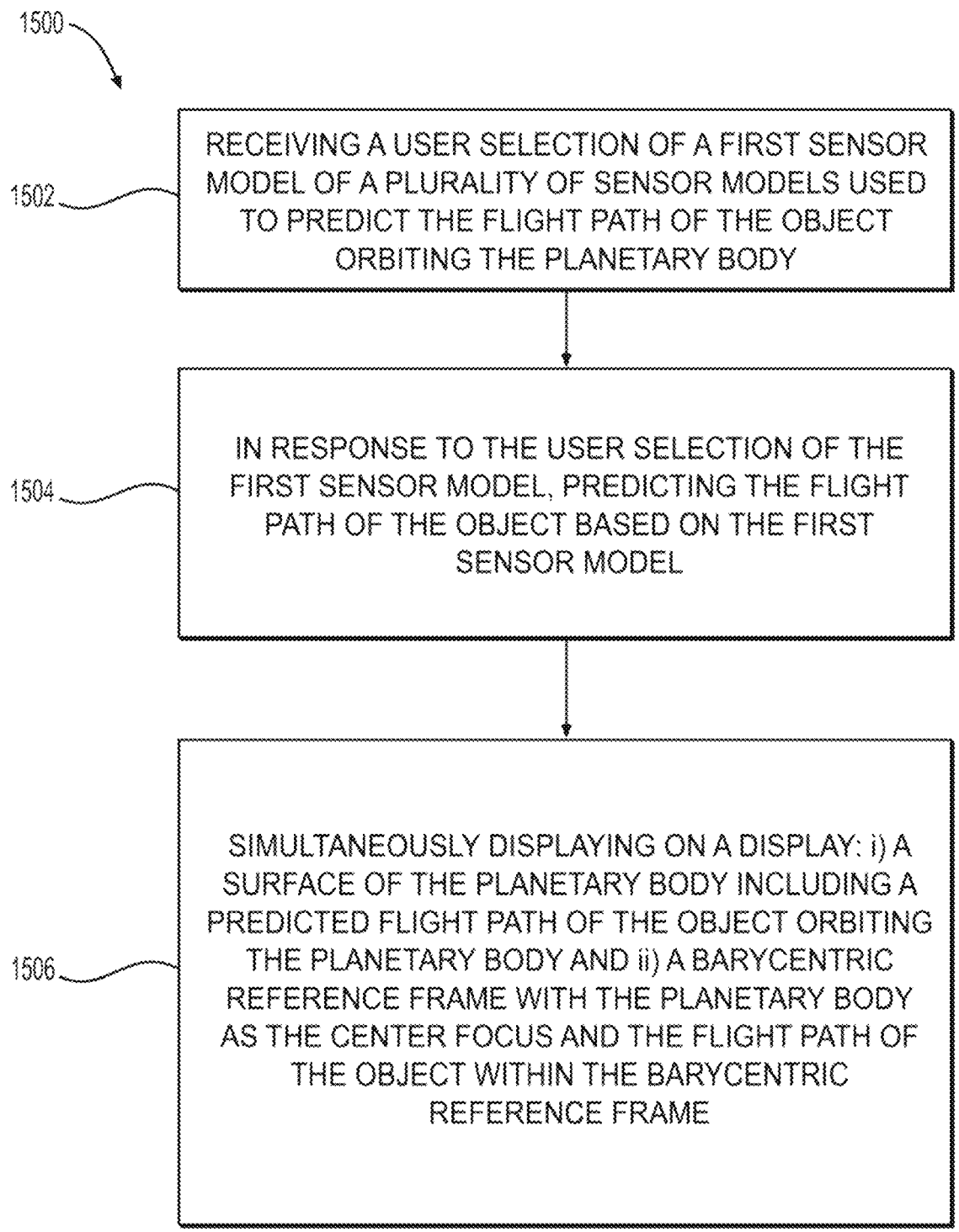
FIG. 15 is a flow diagram of a process for interactively predicting an object's trajectory.

FIG. 15 is a flow diagram of a process 1500 for interactively predicting an object's trajectory. Process 1500 includes: receiving a user selection of a first sensor module of a plurality of sensor modules used to predict the trajectory of the object orbiting the primary body such as the Moon 106 (Step 1502); in response to the user selection of the first sensor module, predicting the trajectory of the object based on the first sensor module (Step 1504); and simultaneously displaying on a display such as display 216: i) a surface of the primary body including a predicted trajectory of the object orbiting the primary body and ii) a barycentric reference frame showing the trajectory of the object in relation to multiple primary bodies, such as the Earth and Moon, within the barycentric reference frame (Step 1506).

It will be apparent to those of ordinary skill in the art that certain aspects involved in the operation of the systems 200 and 300, and other devices may be embodied in a computer program product that includes a computer usable and/or readable medium. For example, such a computer usable medium may consist of a read only memory device, such as a CD ROM disk or conventional ROM devices, or a random-access memory, such as a hard drive device or a computer diskette, SRAM or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. An interactive object trajectory prediction system comprising:
a processor arranged to simultaneously display on a display: i) a surface of a first primary body of a plurality of primary bodies including a predicted trajectory of the object orbiting the first primary body and ii) a barycentric reference frame showing the trajectory of the object in relation to the plurality of primary bodies within the barycentric reference frame; and
an input device arranged to receive a user selection of a first sensor module of a plurality of sensor modules used to predict the trajectory of the object orbiting the primary body;
wherein the processor, in response to the user selection of the first sensor module, predicts the trajectory of the object based in part on the first sensor module.

2. The system of claim 1 comprising a data interface arranged to receive object position data from one or more object position sensors, wherein the processor predicts the trajectory of the object based in part on the object position data.

3. The system of claim 2, wherein the one or more object position sensors are located on the first primary body, on another primary body, or in space relative to the first primary body.

4. The system of claim 3, wherein the displayed barycentric reference frame displays the locations of the one or more position sensors.

5. The system of claim 1, wherein the processor is further arranged to simultaneously display on the display object SNR from at least one of the one or more position sensors.

6. The system of claim 1, wherein the first sensor module includes one of an electro optical/infrared (EOIR) module, a RADAR module, and a quantum RADAR module.

7. The system of claim 1, wherein the first primary body is one of the Moon and Earth.

8. The system of claim 7, wherein the orbital trajectory prediction system includes a cislunar orbit prediction system.

9. The system of claim 1, wherein the surface of the first primary body is displayed in one of a two-dimensional and three-dimensional format.

10. The system of claim 1, wherein the object includes one of a spacecraft, satellite, space debris, a star, a planet, a meteor, a comet, ballistic missile, subsonic missile, supersonic missile, hypersonic missile, and cruise missile.

11. A method for interactively predicting a trajectory of an object orbiting a first primary body of a plurality of primary bodies comprising:
receiving a user selection of a first sensor module of a plurality of sensor modules used to predict the trajectory of the object orbiting the first primary body;
in response to the user selection of the first sensor module, predicting the trajectory of the object based on the first sensor module; and
simultaneously displaying on a display: i) a surface of the first primary body including a predicted trajectory of the object orbiting the first primary body and ii) a barycentric reference frame showing the trajectory of the object in relation to the plurality of primary bodies within the barycentric reference frame.

12. The method of claim 11 comprising receiving object position data from one or more object position sensors and predicting the trajectory of the object based in part on the object position data.

13. The method of claim 12, wherein the one or more object position sensors are located on the first primary body, on another primary body, or in space relative to the first primary body.

14. The method of claim 13, wherein the displayed barycentric reference frame displays the locations of the one or more position sensors.

15. The method of claim 11 further comprising simultaneously displaying on the display object SNR from at least one of the one or more position sensors.

16. The method of claim 11, wherein the first sensor module includes one of an electro optical/infrared (EOIR) module, a RADAR module, and a quantum RADAR module.

17. The method of claim 11, wherein the first primary body is one of the Earth and the second primary body is of the Moon.

18. The method of claim 17, wherein orbital trajectory prediction system includes a cislunar orbit prediction system.

19. The method of claim 11 comprising displaying the surface of the first primary body in one of a two-dimensional and three-dimensional format.

20. A non-transient computer readable medium containing program instructions for causing a computer to interactively predict a trajectory of an object orbiting a first primary body of a plurality of primary bodies comprising the method of:
   receiving a user selection of a first sensor module of a plurality of sensor modules used to predict the trajectory of the object orbiting the first primary body;
   in response to the user selection of the first sensor module, predicting the trajectory of the object based on the first sensor module; and
   simultaneously displaying on a display: i) a surface of the first primary body including a predicted trajectory of the object orbiting the first primary body and ii) a barycentric reference frame showing the trajectory of the object in relation to the plurality of primary bodies within the barycentric reference frame.

* * * * *